United States Patent [19]
Sacks et al.

[11] Patent Number: 5,851,942
[45] Date of Patent: Dec. 22, 1998

[54] PREPARATION OF BORON-DOPED SILICON CARBIDE FIBERS

[75] Inventors: Michael D. Sacks; William Toreki; Christopher D. Batich, all of Gainesville, Fla.; Guang J. Choi, Seoul, Rep. of Korea

[73] Assignee: University of Florida, Gainesville, Fla.

[21] Appl. No.: 915,181

[22] Filed: Aug. 20, 1997

Related U.S. Application Data

[62] Division of Ser. No. 683,475, Jul. 18, 1996, Pat. No. 5,792,416.

[60] Provisional application No. 60/017,131 May 17, 1996.

[51] Int. Cl.$^6$ .......................... C04B 35/565; C04B 35/52
[52] U.S. Cl. .......................... 501/95.1; 501/88; 423/345; 264/DIG. 19
[58] Field of Search ........................... 501/95.1, 88, 126; 423/345; 264/56, DIG. 19, 29.2; 428/367

[56] References Cited

U.S. PATENT DOCUMENTS

| | | | |
|---|---|---|---|
| 4,604,367 | 8/1986 | Takamizawa et al. | 501/95.1 |
| 5,135,895 | 8/1992 | Frechette et al. | 501/95.1 |
| 5,162,269 | 11/1992 | Deleeuw et al. | 501/95.1 |
| 5,167,881 | 12/1992 | Atwell et al. | 501/95.1 |
| 5,223,461 | 6/1993 | Riccitiello et al. | 501/95.1 |
| 5,354,527 | 10/1994 | Frechette et al. | 264/63 |
| 5,366,943 | 11/1994 | Lipowitz et al. | 501/95.1 |
| 5,429,778 | 7/1995 | Patel et al. | 264/29.2 |
| 5,560,991 | 10/1996 | Patel et al. | 428/367 |

*Primary Examiner*—Michael Marcheschi
*Attorney, Agent, or Firm*—Thomas C. Saitta

[57] ABSTRACT

A method of preparing polymer derived silicon fibers comprising the steps of providing a spin dope solution comprising a silicon carbide forming organosilicon polymer, preferably polycarbosilane, a solvent, a soluble boron precursor, preferably solid boron hydride, and a nitrogen containing precursor, preferably polyvinylsilazane; spinning the solution to form high strength green fibers; and heat treating the green fibers to produce high strength, homogeneously doped, boron containing fibers. The fibers produced are high strength, homogeneously boron doped silicon carbide fibers with average tensile strength in the range of from about 2.0 to 4.0 GPa at room temperature.

14 Claims, 2 Drawing Sheets

PREPARATION OF BORON-DOPED SILICON CARBIDE FIBERS

This application is a divisional of application Ser. No. 08/683,475, filed Jul. 18, 1996, now U.S. Pat. No. 5,792,416 which claims the benefit of U.S. provisional application No. 60/017,131, filed May 17, 1996.

This invention was made with Government support under grant/contract no. N00014-91-J-4075 awarded by the Office of Naval Research and Defense Advanced Research Projects Agency. The Government has certain rights in the invention.

BACKGROUND OF THE INVENTION

This invention relates generally to the field of silicon carbide fibers prepared using organosilicon polymers. More particularly, the invention relates to a method, and the products formed therefrom, for producing high-strength, thermally stable, homogeneously boron-doped silicon fibers from organosilicon fibers, preferably infusible polycarbosilane, using soluble solid boron hydride as the boron source. Even more particularly, the invention relates to a method for producing such fibers by providing within the spin dope solution a nitrogen containing precursor to react with the soluble boron precursor to form a stabilized, low volatility compound which remains within the fiber during heat treatment.

Silicon carbide (SiC) is well known as a material with excellent mechanical properties at high temperatures. SiC ceramics are often prepared by forming and consolidating fine SiC particles into a desired shape and subsequently heat treating (i.e., sintering) the "green" shape in order to eliminate the interparticle pores or void space and to obtain a strong body with high relative density (i.e., very little residual porosity). SiC ceramics are also prepared by other methods, especially by chemical vapor deposition (CVD) and by heat treatment of organosilicon polymers. For example, CVD and organosilicon polymer methods have been used to prepare fine SiC particles, SiC fibers, SiC films, etc.

It is well known that SiC ceramics with high relative density (i.e., low residual porosity) and fine grain sizes are desirable in order to attain excellent mechanical properties. However, it is very difficult to prepare pure SiC with high relative density and fine grain sizes by sintering methods, especially by pressureless sintering methods. In samples comprised of fine particles or fine crystallites, pure SiC generally undergoes coarsening or growth of grains or crystallites and pores during high temperature heat treatment because of the dominance of surface diffusion and/or vapor phase diffusion processes. Thus, very little densification (i.e., pore removal) occurs in pure SiC during high temperature heat treatment. As a result of this problem, sintering aid additives are used to enhance the densification and prevent coarsening during sintering and, thereby, allow the fabrication of SiC with high relative density and fine grain sizes. Typical sintering temperatures for preparing dense SiC are in the range of approximately 1800–2300° C.

One of the earliest uses of sintering additives was for processing SiC shapes by hot pressing of SiC powders. It was found that a variety of additives were effective in fabricating SiC with high densities, including a combination of boron and aluminum. Prochazka in U.S. Pat. Nos. 3,853, 566, 3,954,483, and 4,004,934 discovered that small amounts of boron could be used to enhance densification and produce SiC bulk samples with high densities and fine grain sizes. SiC powders were mixed with boron-containing powders, such as elemental boron, boron carbide, and boron nitride, and densified by hot pressing. It was also reported that gaseous boron trichloride could be used to vapor-phase dope boron directly into SiC powders during their synthesis by CVD methods. It was also determined that small amounts of boron, together with small amounts of carbon, allowed the pressureless sintering of the SiC powder compacts to high densities and fine grain sizes. The minimum amount of boron needed for good densification was approximately 0.3 wt %. Numerous other studies also confirmed the benefit of using boron as a sintering aid to obtain SiC with high relative density (low porosity) and fine grain sizes.

Many of the studies on the preparation of boron-doped SiC have been carried out by using mixtures of SiC powders and boron-containing (e.g., boron, boron carbide, and boron nitride, etc.) powders. However, the beneficial effect of using boron doping to form strong, dense SiC has also been demonstrated in other methods of preparation of SiC, including preparation methods using CVD and organosilicon polymers. It has been shown that SiC fibers prepared by CVD can be doped with boron by a vapor phase method. D. E. Elkins, G. M. Mallon, and H. Shimizu, "Modified Silicon-Carbide Continuous Filaments," D-41–D-49, 10th National Symposium, SAMPE, San Diego, Calif., November, 1966 discovered that gaseous boron halides could be used to incorporate varying amounts of boron into SiC fibers. The boron additions resulted in fibers with smoother surfaces, finer grains sizes, and higher tensile strengths.

The use of boron in gaseous form for enhancing densification of SiC was clearly demonstrated by Smoak in U.S. Pat. No. 4,237,085. SiC green compacts were initially prepared from fine SiC particles (crystallites) without incorporating any boron source within the compact. The green compacts were then sintered at high temperature in an atmosphere which contained boron gases. The boron gases were formed by putting volatile boron sources (e.g., boron trichloride, elemental boron, or boron carbide) in the sintering furnace. These sources formed boron-containing vapors during the high temperature sintering treatment. The diffusion and infiltration of the boron gases into the green compacts allowed densification to proceed so that high sintered densities were achieved.

One concern with conventional methods of doping SiC with boron is that gradients in boron concentration may exist throughout the body. This is of concern, for example, when boron is added in relatively coarse form as particulates. It can also be of concern when boron vapors are used to infiltrate inside a porous SiC shape. Differences in boron concentration might be expected at the surface vs. the interior of the SiC shape due to the need for the boron-containing gases to diffuse through the very fine pores (void space) within the SiC shape. If boron is not homogeneously distributed throughout the sample, local areas may undergo poor densification due to low local concentrations of boron. Such poor densification may lead to unreliable samples with poor and/or variable mechanical properties.

Organosilicon polymers are widely used to fabricate various forms of SiC ceramics. Polycarbosilane is an organosilicon polymer frequently used for this purpose. However, during the pyrolysis of polycarbosilane in the absence of oxygen, the ceramic formed does not have the stoichiometric composition of 1:1 atomic ratio of Si:C (i.e., 70:30 weight ratio of Si:C). Instead, the ceramic has SiC plus excess carbon. Typical Si:C atomic ratios are in the range of approximately 1:1.3–1:1.8. A stoichiometric SiC composition can be formed by adding some oxygen during some stage in the processing. The excess carbon can be removed by volatilization reactions with the oxygen. H. Kodama and T. Miyoshi, "Preparation of Fine-Grained SiC Ceramics from Pyrolyzed Polycarbosilane," Adv. Ceram. Mater., 3 [2] 177–179 (1988) showed that polycarbosilane polymer can be heated in air at 190° C. for 0.5 hr to incorporate ~10% oxygen in the polymer. The polymer can then be pyrolyzed at elevated temperature to yield a fine, near-stoichiometric, SiC powder which subsequently can be pressure sintered (with aluminum or aluminum nitride sintering aids) to form SiC ceramic bodies with high relative density (~99 %) and fine grain sizes (~0.3 $\mu$m). Other researchers showed that an alternate approach was to prepare a fine SiC powder in a similar fashion except that the excess carbon that was present in the powder after pyrolysis of the polycarbosilane polymer was subsequently removed by heating the powder in an oxidizing atmosphere to form volatiles. The fine powder was sintered to high relative densities using boron or boron carbide as a sintering aid.

SiC in fibrous form is useful for reinforcement of ceramic, metal, and polymer matrices in order to produce composites with improved properties. The three primary processing methods referred to earlier for fabricating SiC (i.e., fine particle (powder) processing, processing from organosilicon polymers, and chemical vapor deposition) have all been used to prepare SiC in the form of fibers. Boron-doping to improve the SiC fiber properties has been used with each fabrication method. Fibers with fine diameters have been prepared from each method, although the continuous fibers with the finest diameters are most often prepared from organosilicon polymers.

Frechette et al. in U.S. Pat. No. 4,908,340 prepared SiC fibers by either melt spinning or dry spinning of mixtures of SiC particles and organic polymers. In melt spinning, the mixtures were heated to temperatures at which the organic polymers were molten. In dry spinning, the mixtures were prepared with solvents in which the organic polymers were dissolved. Boron was incorporated in the fibers by adding 0.2–1.0 wt % boron carbide powders to the spinning mixtures. Some fibers were heat treated in crucibles which had been coated with slurries containing boron carbide in order to form boron-containing gases during the sintering operation. SiC fibers were sintered at temperatures in the range of 2000–2300° C. Fibers were formed with diameters in the range of 2–300 $\mu$m, although diameters in the range of 10–150 $\mu$m were more common. SiC fibers with grain sizes less than 1 $\mu$m were produced.

Bolt et al. in U.S. Pat. No. 4,942,011 prepared SiC fibers by spinning a mixture of SiC particles and organosilicon polymer. The volume ratio for particles to polymer was approximately 2:1. The preferred polymer was a commercially-available, low-molecular-weight polycarbosilane. The polymer was dissolved in an organic solvent (e.g., xylene) and the SiC particles were dispersed in the polymer solution, together with processing additives (i.e., a dispersant to disperse the SiC particles in the solvent and a sintering aid for densification of the as-spun fibers at high temperatures). The dispersant used in the Examples was OLOA 1200. The sintering aids used were either boron carbide or aluminum nitride. The concentration of the sintering aids was 0.2–5% based on the SiC weight. The concentrated suspension was either wet or dry spun to form "green" fibers. Fibers were heat treated (sintered) at temperatures in the range of 1800°–2200° C. The solid SiC particles in the green fibers made the fibers sufficiently resistant against slumping during heat treatment (i.e., during which the low-molecular-weight polycarbosilane polymer melted) that it was not necessary to carry out a separate cross-linking step for the polymer. The sintered fibers had diameters in the range of 10–200 $\mu$m and the grain sizes were in the range of 0.5–10 $\mu$m. The density of the fibers exceeded 3.0 g/cm$^3$.

Birchall and Clegg in U.S. Pat. No. 5,063,107 prepared SiC fibers in a similar manner to Frechette et al. and Bolt et al. They used mixtures of SiC particles and organic polymers. They also utilized known sintering aids, such as boron or carbon.

Yajima et al., in several papers and in U.S. Pat. Nos. 4,100,233, 4,220,600, 4,283,376 and 4,052,430, developed processes for preparing polycarbosilane polymers and SiC-based fibers from polycarbosilane polymers. Yajima prepared polycarbosilanes from many organosilicon precursors. A particularly favorable route for preparing SiC-based fibers involved using polycarbosilane prepared from polysilanes, such as polydimethylsilane. The polycarbosilane products were usually low-molecular-weight polymers (typically ~1,000–2,500) which melted upon heating. Thus, the polymers were particularly useful for preparing fibers by melt spinning. However, for melt spun fibers, it is necessary to cross-link (i.e., infusibilize) the polymeric fibers prior to heat treatment at the elevated temperatures needed to convert the polycarbosilane fiber to an SiC-based ceramic fiber. If such polymeric fibers are not cross-linked prior to heat treatment at elevated temperatures, they will re-melt and the fibers will completely lose their shape and identity as individual filaments. Cross-linking (or infusibilization) prevents the fibers from melting during heat treatment. Fibers were usually cross-linked with oxygen by heat treating the fibers at low temperature (~100°–250° C.) in an oxygen-containing atmosphere (e.g., air). Studies have shown that Si—O bonds (i.e., as Si—O—Si or Si—O—C) are introduced into the polymer during the cross-linking process. After cross-linking, the fibers can be directly heat treated to decompose the polymeric solid to an SiC-based ceramic solid with the concurrent evolution of volatiles out of the fiber. The process developed by Yajima et al. is the basis for NICALON™ fibers which are manufactured by Nippon Carbon Co., Ltd. A similar commercial process involves using a titanium metal-modified polycarbosilane (i.e., a polytitanocarbosilane) polymer and is the basis for TYRANNO™ fibers which are manufactured by Ube Industries Ltd.

The fiber processes based on the work of Yajima et al. yield fibers which are not pure stoichiometric SiC, i.e., the fibers do not have an Si:C atomic ratio of 1:1 (equivalent to an Si:C weight ratio of 70:30). This is because heat treatment is carried out at too low temperature (typically<1200° C.) to eliminate excess carbon and oxygen by volatilization reactions. Thus, the commercially-produced fibers contain relatively large amounts of excess carbon and oxygen. For example, in regard to oxygen, NICALON™ fibers typically contain ~8–15% oxygen because of the oxidative cross-linking step. TYRANNO™ fibers also contain significant amounts of oxygen (and excess carbon). In addition, TYRANNO™ fibers also contain titanium, so the fiber are actually Si—Ti—C—O fibers. NICALON™ and TYRANNO™ fibers will degrade extensively at elevated temperatures due to reactions between excess carbon and siliceous (Si—O containing) material. Some of the reactions known to occur between siliceous material and carbon at elevated temperatures (i.e., typically in the range of ~1100°–1600° C.) include:

$$SiO_2 + C \Rightarrow SiO\uparrow + CO\uparrow \qquad (3)$$

The formation and removal of volatile products (primarily CO and SiO) from NICALON™-type and TYRANNO™-type fibers leads to large weight losses and the development of porosity. After the reactions are completed and the oxygen and excess carbon are removed, the fibers have a near-stoichiometric composition (i.e., Si:C atomic ratio of 1:1). Continued heat treatment of these fibers, especially above ~1500° C., results in rapid coarsening of the porosity and rapid coarsening of the SiC grains (crystallites) and other strength-degrading flaws, all of which result in fibers with very low strengths. Hence, the fibers produced by the processes developed by Yajima et al., which were described above, show degradation of the mechanical properties after heat treatments above approximately 1200° C. and the mechanical properties become extremely poor around 1500° C. or above. Therefore, various approaches have been developed (described later) to improve the thermomechanical stability of SiC fibers.

As in numerous other studies, Yajima did find that boron is a useful sintering additive for sintering of SiC powders derived from organosilicon polymers. Yajima et al., in some of the earlier cited patents and in U.S. Pat. No. 4,152,509, also reported that SiC fibers could be prepared from polycarbosilane polymers which were synthesized from a polysilane and a phenyl-containing polyborosiloxane. A typical method for synthesis of the boron-containing polymers (i.e., phenyl-containing polyborosiloxane polymers) involved reacting boric acid with a diphenylchlorosilane, although other reactants were also reported. The reaction to form the polycarbosilane from a polysilane and a phenyl-containing polyborosiloxane was carried out at temperatures in the range of approximately 250°–500° C. The resulting polycarbosilane had some residual siloxane linkages (Si—O—Si) in the backbone (i.e., in addition to the primary backbone structure composed of Si—C—Si linkages). However, it was found that only a trace of boron was present in the synthesized polycarbosilane. Hence, only a trace of boron would remain in fibers prepared from such polymers. Thus, the residual concentration of boron in the fibers was too low to prevent the rapid coarsening of grains and pores in the subsequently prepared fibers. The boron content in the fibers was indicated to be "several tens to several hundred ppm" and "not more than 500 ppm". However, it has been shown from many studies of processing of SiC with boron sintering aids (i.e., beginning with the patents by Prochazka cited earlier) that boron concentrations in the range of 0.2–1.0 wt % (2,000–10,000 ppm) are generally needed to achieve high relative densities during sintering of SiC. Therefore, the fibers prepared based on the method of Yajima et al. (such as NICALON™ and TYRANNO™ fibers) are limited in application temperature because a dense, fine-grained structure cannot be maintained at temperatures above approximately 1200° C.

Other methods have been reported for introducing boron into organosilicon polymers and using such polymers to prepare SiC-based fibers. However, these methods may be either inconvenient to use and/or they have not resulted in SiC-based fibers with good thermomechanical stability at high temperatures, e.g., at temperatures above ~1500° C. Takamizawa et al. in U.S. Pat. No. 4,604,367 prepared SiC-based fibers which contained boron by using organoborosilicon polymers. These polymers were prepared by reacting an organopolysilane with an organoborazine compound, such as B-trimethyl-N-triphenyl borazine, B-trivinyl-N-triphenyl borazine, and B-triamino-N-triphenyl borazine. The organoborosilicon polymers were melt spun into green fibers which were infusibilized by oxidative or irradiative cross-linking methods and subsequently pyrolyzed to form SiC-based fiber containing boron and nitrogen. The infusibilized fibers also contained oxygen, even when infusibilization was carried out by electron beam irradiation. Hence, the tensile strength of the fibers started to decrease at heat treatment temperatures above approximately 1100°–1200° C. due to reactions such as given by equations (1)–(3) above. Although Takamizawa et al. indicated that heat treatments could be carried out at temperatures up to 1800° C., the preferred heat treatment temperatures were <1600° C. However, it would be expected that the latter temperature would be too low to accomplish densification, i.e., too low to eliminate the pores in the fiber that develop due to reactions (1)–(3). Hence, it is not surprising that Takamizawa et al. did not produce fibers having high tensile strength after heat treatment at ~1500° C. As noted earlier, boron additions restrain grain (crystallite) coarsening and pore coarsening that tend to occur during high temperature heat treatment of SiC. Thus, Takamizawa et al. did observe (from X-ray diffraction measurements) that the increase in the size of the β-SiC crystallites during heat treatment was decreased by the addition of boron. This led to some modest improvement in the thermomechanical stability, but the tensile strengths were still low after heat treatment at 1500° C.

Other processing approaches have been more successful in producing SiC-based fibers with improved thermal stability compared to the NICALON™ and TYRANNO™ fibers. For example, SiC fibers can be initially fabricated with low oxygen content. This minimizes the degradation of the fibers due to reactions (1)–(3) given earlier. Fibers with low-oxygen content and carbon-rich stoichiometry (i.e., ~64 wt % Si compared to 70 wt % Si for stoichiometric SiC) have been developed by researchers at the Nippon Carbon Co., Ltd. These fibers were prepared in a similar manner to NICALON™ (i.e., melt spinning of polycarbosilane), except that cross-linking was accomplished by electron beam irradiation (instead of oxidation). Thermal stability of the fibers improved as the residual oxygen content of the fibers decreased. Fibers with ~0.5 wt % oxygen are currently being commercialized as HI-NICALON™. These fibers have high relative density and fine grain sizes. Other researchers have produced carbon-rich, low-oxygen-content, SiC-based fibers by using halogenated hydrocarbon or unsaturated hydrocarbon vapors to cure melt-spun polycarbosilane fibers. Pyrolyzed fibers showed improved thermal stability compared to oxidatively-cured NICALON-type fibers.

Researchers at Dow Corning have also reported in U.S. Pat. Nos. 5,071,600 and 5,162,269 the fabrication of low-oxygen-content, SiC fibers with carbon-rich or near-stoichiometric composition by melt spinning of low molecular weight polycarbosilane. Fibers were oxidatively cured to prevent melting of the fibers during subsequent heat treatment. The primary modification of the process of Yajima et al. was to incorporate a sufficient amount of boron (>0.2 wt %) in the fibers to prevent coarsening of pores and grains after pyrolysis and subsequent high temperature heat treatment. This allowed fibers to be sintered to high relative density and fine grain sizes. The Dow Corning patents describe mostly gas phase doping methods, similar to that used by Smoak in U.S. Pat. No. 4,237,085, to introduce boron into fibers. In these methods, boron gases are infiltrated into the fiber at some stage in the processing. Such methods are less convenient and more difficult to control compared to introducing boron directly into the spin dope, i.e., prior to forming the fiber.

In the U.S. Pat. No. 5,071,600 by Deleeuw et al. (Dow Corning Corp.), suitable pre-ceramic polymers are described as polycarbosilane polymers such as prepared according to patents by Yajima et al. It was stated that the preferred polycarbosilane can be purchased from Nippon Carbon Co. These are well known to be relatively low-molecular-weight polymers. The preferred polymers are described to have softening points less than 100° C., i.e., the polymers will clearly melt when heated to sufficiently high temperature. Thus, the polymers were useful for melt spinning of fibers. It was specifically stated and claimed that the spun fibers must be infusibilized to prevent melting during pyrolysis, otherwise the fibers would completely lose their shape during the pyrolysis process. Infusibilization is also referred to as "curing" and results in a highly cross-linked polymer which will not melt upon heat treatment. Infusibilization was accomplished by one of three methods: (i) heating the fibers between 50°–200° C. in air, (ii) heating the fibers between 25°–200° C. using a sequential exposure to a boron-containing gas, such as boron trifluoride, boron tribromide, or boron trichloride, and then an amine such as ammonia, or (iii) heating between 25°–200° C. in a nitrous oxide atmosphere. It was stated that infusibilizing heat treatments required from 4 to about 24 hours, although some examples were given in which the times were reported to be over 24 hours. It was also stated that fibers can be infusibilized by gamma irradiation or exposure to UV light, which are known methods for curing polymers. The boron gas phase could be introduced into the as-spun fibers before, during, or after the infusibilization step. The boron-containing gases included diborane, boron trifluoride, boron tribromide, and boron trichloride. The temperatures and times for exposure to the boron atmosphere were in the ranges of 25–°200° C. and 4–24 hours, respectively. After infusibilization and boron doping, fibers were pyrolyzed at temperatures greater than 1600° C. (and preferably 1800°–1850° C.) in an non-oxidizing environment. Oxygen and nitrogen were eliminated from the fibers to levels below 0.5% during the heat treatment. Fibers were densified and became strong during the high temperature heat treatment.

U.S. Pat. No. 5,268,336 by Deleeuw et al. (Dow Corning Corp.) is similar to U.S. Pat. No. 5,071,600 (by the same inventors), except that the starting polymer was a methylpolydisilylazane, instead of polycarbosilane. Also, the boron was incorporated during synthesis of the polymer. In all the examples, a phenyl-modified methylpolydisilylazane was prepared by heat treatment of a mixture of methylchlorodisilane, dichlorophenylvinylsilane, and hexamethyldilazane. Boron tribromide was also included in the reaction mixture in order to incorporate boron in the polymer. Fibers were then melt spun, infusibilized in air, and pyrolyzed at 1200° C. Fibers were subsequently heat treated at temperatures in the range of 1800°–2100° C. to remove oxygen and nitrogen and to densify the fibers. Fibers were mostly crystalline SiC with densities of about 2.9 g/cm$^3$ and residual oxygen contents of about 0.1–1.1%. Average strengths were 96–125 ksi (which is very poor for fine-diameter, polymer-derived SiC fibers). This method does not seem very useful compared to other methods because the weight losses during pyrolysis were high (meaning that the ceramic yield was low) and the final fiber strengths were low.

U.S. Pat. No. 5,167,881 by Atwell et al. (Dow Corning Corp.) is similar to U.S. Pat. No. 5,071,600 (by inventors at Dow Corning Corp.), except that the starting polymer was a phenyl-containing polyorganosiloxane resin, instead of polycarbosilane. The polymers had low molecular weights (about 1,000–1,500) and the fibers were melt spun. In this patent, other compounds were mentioned as possible boron dopants. It was stated in this patent (and in U.S. Pat. No. 5,268,336 by inventors at Dow Corning Corp.) that "boron may be incorporated into the fibers during the early stages of pyrolysis by exposing the fibers to an atmosphere containing a boron-containing gas. For example, the fibers may be exposed to an atmosphere containing diborane, or other boron hydrides such as tetraborane, pentaborane, or the like. Other boron-containing compounds such as borazine or trichloroborazine may also be used if the temperatures of the atmosphere are such that the compounds are vaporized and present in gaseous form." The temperature range at which the boron compounds were added was extended in this patent from about 50° C. to about 500° C. This patent also mentions exposing the fibers during spinning to an atmosphere with boron trichloride, but it seems that a subsequent doping step with boron-containing gas is still needed to incorporate the necessary amount of boron. This method does not seem very useful compared to other methods because the weight losses during pyrolysis were high (meaning that the ceramic yield was low) and no strengths for the fibers were reported. It was only reported that the fibers were substantially crystalline SiC with small grain size, relatively high density (about 2.93–3.03 g/cm$^3$) and low final oxygen content (about 0.12%).

U.S. Pat. No. 5,279,780 by Lipowitz and Rabe (Dow Corning Corp.) describes the conversion of commercially-available SiC-based ceramic fibers to fibers that have higher crystalline SiC content and improved thermomechanical stability. Commercially-available NICALON™ (Si—C—O fibers) and TYRANNO™ (Si—C—O—Ti) fibers were used in some examples of this process. As indicated earlier, these fibers are known to undergo decomposition reactions which release CO and SiO volatiles during heating treatment at temperatures in the range of ~1200°–1500° C., resulting in a porous fiber with near-stoichiometric composition. Further heat treatment at higher temperatures (>1500° C.) results in substantial coarsening of SiC grains and pores due to the absence of appropriate amounts of a sintering aid. However, if the high temperature heat treatments are carried out in a boron-containing atmosphere, then boron can diffuse into the fiber, prevent grain and pore coarsening, and allow densification of the fiber to proceed at temperatures in the range of 1600°–2200° C. It is stated in the patent that numerous metal compounds can be used as the sintering aid, but the only specific methods cited were carried out with the most well-known sintering aid, i.e., boron. All examples use $B_2O_3$ as the boron compound and it is well known that $B_2O_3$ volatilizes at high temperatures. This process of converting a SiC-based fiber with oxygen or nitrogen to a nearly fully crystalline SiC fiber was also carried out using several developmental SiC-based fibers formed from siloxane polymer, phenyl vinyl modified methylpolydisilylazane polymer, and hydridosilazane polymer. Fibers prepared from NICALON™ and TYRANNO™ had high density (around 3.1 g/cm$^3$) and high modulus (around 60 Msi) values which were consistent with the fibers being substantially crystalline SiC. Fibers were reported to have near-stoichiometric composition, fine grain sizes, low oxygen contents, and moderate tensile strengths (as high as 319 ksi).

Most of the methods for fabricating fibers from polycarbosilane (or boron-modified or titanium-modified polycarbosilane) utilized melt spinning of low-molecular-weight polymers. In contrast, Torekietal. in U.S. Pat. Nos. 5,171,722, 5,242,870 and 5,278,110 produced carbon-rich, low-oxygen-content SiC-based fibers by dry spinning of high-molecular-weight polycarbosilane. The as-spun polymer fibers did not require infusibilization (i.e., curing) by oxygen cross-linking because the high-molecular-weight polycarbosilane did not melt extensively during the pyrolysis treatment. The optimum method of preparing fibers required the use of a polycarbosilane with molecular weight and degree of branching such that the polymer "softens slightly" or "foams slightly" upon heat treatment. The polycarbosilane molecular weight was 9,500 for the example used in the patent. The polymer was rendered completely infusible by first incorporating a vinylic SiC precursor, such as polyvinylsilazane, in the range of ratios of about 20:1 to about 2:1 of the PCS to the vinylic SiC precursor and then heating the polymeric fiber mixture to above approximately 125° C. It was stated that "The crux of the invention resides in the selection of the vinylic SiC precursor, i.e., a compound or polymer having vinylic unsaturation and capable of being pyrolyzed to produce SiC." Because oxygen was not incorporated during the cross-linking reaction, the fibers had low oxygen content and showed significantly improved thermal stability compared to NICALON™ fibers and apparently had similar structure and properties to the HI-NICALON™ fibers.

SUMMARY OF THE INVENTION

The invention in general is a method of preparing boron-doped silicon carbide fibers from organosilicon polymer solutions, and the high strength, homogeneously doped fibers produced therefrom. A spin dope is prepared by dissolving an organosilicon polymer capable of forming silicon carbide, preferably an infusible organosilicon polymer, such as infusible polycarbosilane (PCS) with a preferred average molecular weight of from 5,000 to 20,000 and a most preferred average molecular weight of from 7,000 to 16,000, in a suitable solvent, such as benzene, chloroform, cyclohexane, hexane, octane, tetrahydrofuran, toluene, xylene or the like. the solvent concentration is preferably from approximately 20 to 50 weight percent and most preferably from approximately 25 to 40 weight percent. To this spin dope mixture is added a soluble boron containing precursor additive, preferably a soluble solid boron precursor such as solid boron hydride (decaborane), which provides a source of boron which acts as a sintering aid. To this spin dope mixture is also added a soluble nitrogen containing precursor, preferably from the class of organosilazanes, such as polyvinylsilazane, or other nitrogen containing compounds, such as polyfunctional amines, in sufficient amount to react with the boron precursor to form a low volatility compound which substantially remains in the spin dope, green fibers and sintered fibers even after heat treatment. Alternatively, a pre-reacted soluble compound formed by mixing the soluble boron precursor with a suitable nitrogen containing precursor can be first formed and then added to the spin dope mixture. The solid boron hydride concentration is preferably from 0.25 to 4.0 weight percent, and the ratio of solid boron hydride to the nitrogen containing precursor may range from at least 60:1 to 1:20. The larger amounts within this range, or even greater amounts, of the boron containing precursor may be added when it is desired to incorporate more boron in the silicon carbide fiber than needed for the purposes of achieving good sintering behavior, or when it is desired to use the boron precursor as a spinning aid. The larger amounts within the aforementioned range, or even greater amounts, of the nitrogen containing precursor may be added when it is desired to use the nitrogen containing precursor as a spinning aid, or when it is desired to incorporate larger amounts of nitrogen in the fiber. A spinning aid, which can be an organic compound, such as polyisobutylene, or a metal organic compound, which is preferably an organosilicon polymer which decomposes to silicon carbide, such as polysilazane, polysiloxane or polysilane, may also be added if required, although it has been found that the boron precursor, if present in sufficient quantity, itself acts as a spinning aid. A polymerization catalyst, such as dicumyl peroxide, can also be added to the spin dope solution, although it is not required. The spin dope is thoroughly mixed to insure that the boron precursor, as well as the other components, is uniformly incorporated throughout the spin dope solution, such that boron will be homogeneously distributed throughout the fibers formed from the spinning solution.

The spin dope is filtered and excess solvent removed by evaporation, then the spin dope is dry spun using conventional techniques to produce fine diameter "green" (non-heat treated) fibers with relatively high tensile strengths in the range of about 15 to 30 MPa, which is due to the use of an infusible, high molecular weight PCS. The green fibers are then heat treated to evaporate residual solvent, to decompose the organosilicon polymer to an SiC ceramic, to adjust the final stoichiometry and to sinter or densify the fiber. The green fibers may be initially heated to temperatures of from about room temperature to 100 degrees C. in a non-oxidizing atmosphere, then placed in an oxidizing atmosphere and heated to between about 100 to 300 degrees C. which allows the Si:C stoichiometry to be altered after subsequent heat treatment at higher temperatures. Alternatively, the fibers can be heated directly in an oxidizing atmosphere from room temperature to between about 100 to 300 degrees C. The fibers are then heated directly in a non-oxidizing atmosphere to up to between about 1700 and 2000 degrees C. for sintering, resulting in a high strength, homogeneously doped, boron containing, silicon carbide fiber.

The methodology with slight variation can also be employed to produce silicon carbide films, coatings or bulk articles having boron homogeneously doped therein. For SiC films and coatings, as well as for infiltration of organopolymer solutions in continuous fiber preforms, the solution is prepared with significantly lower viscosity relative to the viscosity of the solution used in fiber spinning, i.e., the polymer concentration would be lower and the solvent concentration higher. In powder processing of SiC bulk shapes, the powder formed or compacted is first homogeneously doped with boron by mixing a solution containing the boron precursor and organosilazane polymer or other nitrogen containing precursor with an SiC powder suspension.

DETAILED DESCRIPTION OF THE INVENTION

Figure 1:
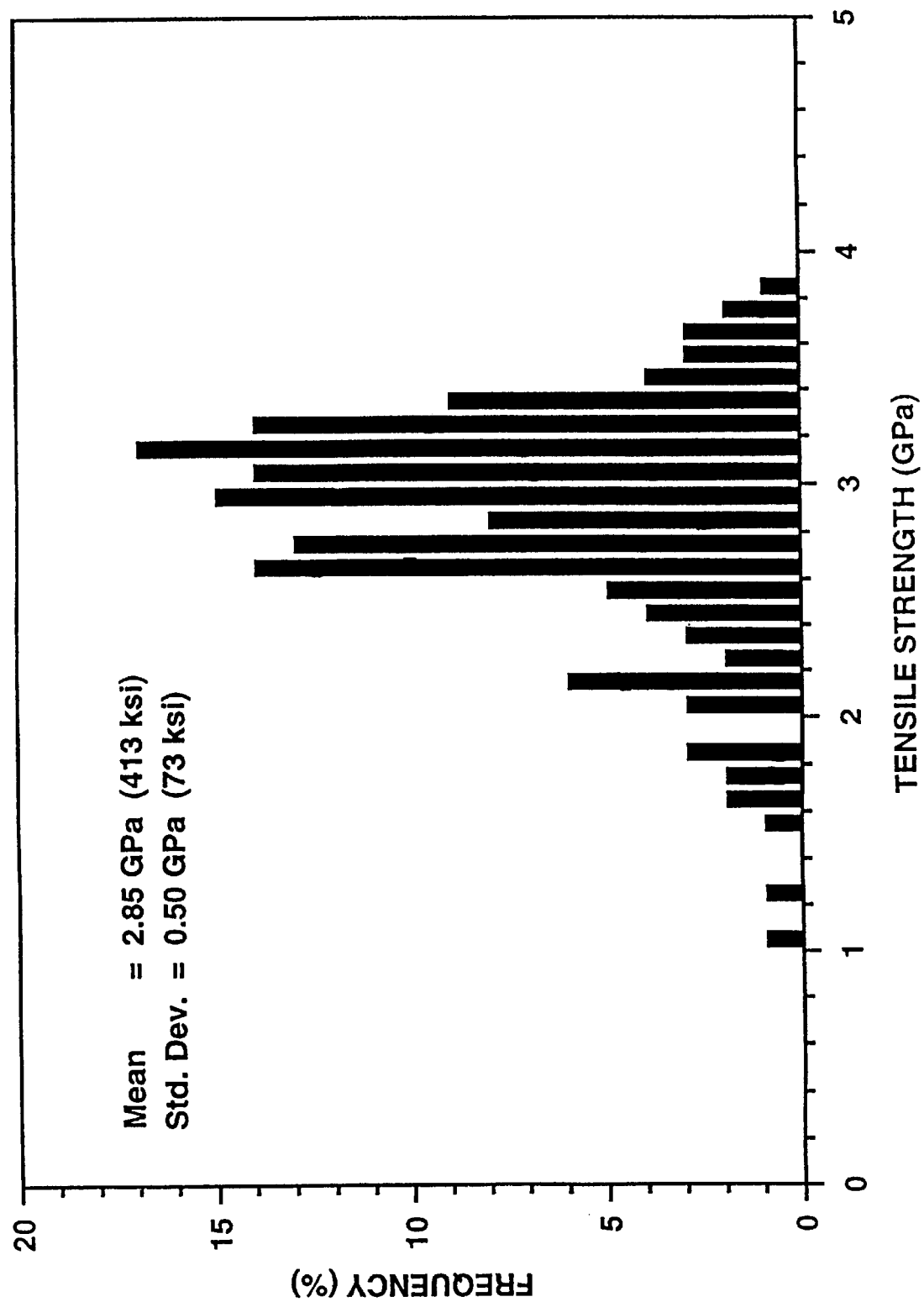
FIG. 1 is a histogram plot of the distribution of fiber tensile strengths.

Silicon carbide fibers were prepared by dry spinning of boron-containing, organosilicon polymer solutions. In the preferred embodiment of this invention, the main polymeric component used to prepare the fiber spinning solution is polycarbosilane (PCS). PCS can be synthesized by many methods. Most synthesis methods yield relatively low molecular weight PCS which melts completely upon heat treatment. However, in this invention, it is preferred to used PCS which is completely infusible and shows no melting (or softening) upon heat treatment. In order for PCS to be infusible, the PCS should have a controlled molecular weight and degree of branching, regardless of the synthesis method used. The average molecular weights for PCS in this invention are preferably in the range of approximately 5,000–20,000 with a preferred molecular weight range of approximately 7,000–16,000. The molecular weight is determined by gel permeation chromatography. One method for synthesizing PCS in this molecular weight range is pressure pyrolysis of polydimethylsilane. In the present invention, it is preferred to use a PCS which has a molecular weight and degree of branching such that the pure polymer (with no other compounds present) is completely infusible and undergoes no melting, softening, and/or foaming during heating treatment. The advantage of using this polymer to prepare fibers is that no infusibilizing step is needed prior to heat treatment steps used to convert the polymeric fiber to an SiC ceramic fiber. Those familiar with the art will recognize that the molecular weight and degree of branching of the polymer (and the polymer's melting and solubility behavior) will depend on a variety of conventional synthesis variables (e.g., reaction time, temperature and pressure; reactor characteristics such as size and geometry); etc.). The PCS polymers in this invention were synthesized using pressure pyrolysis of polydimethylsilane in a stainless steel autoclave under a nitrogen atmosphere.

PCS polymer prepared by pressure pyrolysis is purified and further refinement of the molecular weight distribution is obtained by conventional dissolution, filtration, and precipitation methods. A concentrated polymer spin dope solution is then prepared in order to fabricate fibers by dry spinning. Those familiar with the art of fiber spinning will recognize that concentrated polymer spin dope solutions can often be used to prepare fibers by wet spinning processes also.

The spin dope is composed of PCS polymer, one or more solvents, one or more spinning aids, and one or more sintering aids. The spin dope viscosity is primarily determined by the polymer concentration (i.e., polymer/solvent ratio), the polymer molecular weight, and the solvent type. The preferred range of polymer concentrations are from approximately 50 to 80 weight percent with a more preferred range of approximately 60 to 75 weight percent. The preferred range of solvent concentrations is from approximately 20 to 50 weight percent, with a more preferred range of approximately 25 to 40 weight percent. The preferred range of spin dope viscosity is in the range of approximately 10 to 150 Pa·s. The liquid component can be any suitable solvent that will dissolve PCS and the other spin dope components. Known solvents for PCS include benzene, chloroform, cyclohexane, hexane, octane, tetrahydrofuran, toluene, xylene, and any other compounds with similar solubility parameters. Spinning aids are typically organosilicon polymers, although other spinning aids, such as organic polymers, may also be used. The organosilicon polymers are preferred spinning aids because they convert upon pyrolysis heat treatments to SiC-based ceramics (e.g., β-SiC), i.e., the same type of products formed during heat treatment of the PCS polymer. Typical spinning aids include polysilazanes, polysiloxanes, and polysilanes. For example, suitable polysilazanes include those described by Toreki et al. in U.S. Pat. No. 5,171,722 and in "Synthesis and Applications of a Vinylsilazane Preceramic Polymer," Ceram. Eng. Sci. Proc., 11 [9–10] 1371–1386 (1990). Suitable polysiloxanes may be prepared in the same manner as the polysilazanes except that a siloxane monomer is used. An important characteristic of suitable organosilicon polymer spinning aids are that they are soluble in the same solvents as the polycarbosilanes. It is also desirable that they form SiC-based ceramics upon pyrolysis. One or more of these additives can be used in the spin dope. The amounts of these additives in the concentrated spin dope can range from less than 0.1% to at least 15% and even higher concentrations may be utilized.

As previously stated, the use of boron in various forms is well-known as a sintering aid for fabrication of SiC. The present invention uses a novel approach by incorporating a soluble boron precursor additive during preparation of the spin dope. This soluble boron precursor additive unexpectedly remains in the fiber after pyrolysis and, therefore, is able to act as a sintering aid to allow formation of dense SiC fibers. The approach of using the soluble boron precursor additive has at least two advantages: (i) the boron is uniformly distributed throughout the fiber and (ii) the boron concentration is easily and simply controlled. In regard to the first advantage, by uniformly distributing the boron on a molecular scale (i.e., as a dissolved component) in the spin dope, boron can be uniformly and homogeneously distributed in the fibers that are formed from the spin dope. In contrast, methods which utilize non-soluble boron-containing powders (such as non-soluble particles of elemental boron, boron carbide, boron nitride, etc.) are disadvantageous because the boron is not distributed in the spin dope on a molecular level. Hence, the boron distribution will be non-uniform and inhomogeneous compared to the present invention in which the boron precursor is dissolved in the spin dope and therefore becomes distributed on a molecular level throughout the spin dope. In addition, methods which require infiltration of the boron into a pre-existing fiber may result in boron concentration gradients in the fiber. For example, some methods depend on infiltration of gaseous boron species into the fibers which requires diffusion from the surface of the fiber to the interior of the fiber through extremely fine pore channels. This could lead to concentration gradients of the dopant from the surface to the interior of the fiber and hence a homogenous distribution of boron in the fiber may not be achieved. In addition, there may be variations in boron concentration from fiber to fiber if the boron doping is carried out using fibers in "tow" form (i.e., in the form of a bundle consisting of a large number of individual fibers). Again, there may be difficulty in diffusing the boron-containing gas throughout the multi-filament tows and achieving a uniform boron concentration in each fiber. Furthermore, it may be difficult to precisely control the concentration of boron in the fiber since it is necessary to know the diffusion rates of the boron into the fibers and fiber tows under conditions in which the temperature and atmosphere surrounding the fibers and fiber tows may be varying widely during the gas-phase doping process. In addition, the fiber pore channels that allow ingress of the boron-containing gases into the fibers may vary in character as doping proceeds and as the temperature and atmosphere vary during the doping process. In contrast, the present invention has the advantage of providing a very simple method to control the concentration of boron in the fiber because the concentration is simply dependent upon the amount of the boron precursor that is weighed out and added to the spin dope.

In this invention, the boron precursor additive may be added directly into the spin dope as solid boron hydride. Solid boron hydride has not been used prior to this invention as a boron sintering aid for enhancing densification of silicon carbide. Solid boron hydride is soluble in the solvents used to prepare the fiber spin dope. The amount of the solid boron hydride in the concentrated spin dope is typically in the range of approximately 0.25% to approximately 4.0%. Higher and lower concentrations can be readily introduced into the spin dope, but higher concentrations introduce more boron than needed to produce dense SiC fibers and lower concentrations may not introduce enough boron to produce dense SiC fibers.

Thermal gravimetric analysis reveals that solid boron hydride normally begins to vaporize at approximately 100° C. (at normal atmospheric pressure) and is nearly completely vaporized by approximately 200° C. (at normal atmospheric pressure). Therefore, it would normally be totally useless to incorporate solid boron hydride into a SiC body (fiber, film, bulk sample, etc.) for the purposes of serving as a densification aid during sintering at elevated temperatures. This is because the boron would be eliminated (by vaporization) from the fiber during the very early stages of heat treatment (i.e., at temperatures<200° C., which is more than 1500° C. below the sintering temperature). However, in this invention, an unexpected method was found to retain the boron in the fiber during the heat treatment. It was found that boron could be retained in the fiber by reacting the boron precursor (solid boron hydride) with one of the organosilicon precursors, i.e., polyvinylsilazane. Thus, a key aspect of this invention is the ability of the solid boron hydride to complex with the polyvinylsilazane polymer to form a stable solid which thereby prevents the vaporization and loss of the boron from the fiber during heat treatment. It must be emphasized that, in total contrast to some of the previously described methods of doping SiC fibers with boron, the present invention is predicated on avoiding the formation of boron-containing gases during heat treatment.

Suitable polyvinylsilazanes for this process are as described in the Toreki et al. patents and paper cited earlier. Many other possible methods of preparing polysilazanes are also known. The ratios of solid boron hydride to polyvinylsilazane in the spin dope can be varied widely from a range of at least approximately 60:1 to at least approximately 1:20. A further advantage to this process is that the reaction between the solid boron hydride and polyvinylsilazane can be carried out "in-situ" during spin dope preparation, i.e., it is not necessary to prepare a separate polymer for incorporation in the spin dope. Alternatively, however, it is possible to prepare a pre-reacted borosilicon polymer by using solid boron hydride as one of the reactants and then adding this pre-reacted borosilicon polymer to the fiber spinning solution. It can also be envisioned that such pre-reacted borosilicon polymers could be useful in the case in which fibers were formed by melt spinning of low-molecular-weight PCS, although the latter method is not a preferred method for this invention because fibers which are melt spun from low-molecular-weight PCS require an undesirable infusibilization step.

Another unexpected advantage of using solid boron hydride is that it acted as a spinning aid. It was determined that fibers could be processed with relatively low concentrations of the other organosilicon or organic spinning aids if solid boron hydride was used.

The reaction between solid boron hydride and the polysilazane polymer is postulated to involve complexation between boron in the boron hydride and the nitrogen in the polysilazane polymer. Therefore, it is anticipated that, in addition to nitrogen-containing organosilicon polymers, many other nitrogen-containing compounds (such as polyfunctional amines) could be reacted with the solid boron hydride to form suitably stable products that would prevent volatilization of the boron densification aid during heat treatment. Such reactions to form stable compounds could be carried out in-situ (i.e., in the fiber spinning solution) or prior to the formulation of the spin dope. The formation of such stable compounds with low volatility is essential to the process. Without the formation of such stable compounds, solid boron hydride would not be retained in the fibers during heat treatment and, thus, would be not be useful as a densification aid.

As stated previously, the preferred embodiment of this invention utilizes PCS polymers to fabricate the SiC fibers. However, it should be expected that the boron-doping method described in this invention has general applicability to the fabrication of SiC fibers from other organosilicon polymers that were used in other studies, including methylpolydisilylazane polymers (such as used by Deleeuw et al. in U.S. Pat. No. 5,268,336), phenyl-containing polyorganosiloxane polymers (such as used by Atwell et al. in U.S. Pat. No. 5,167,881), etc. The method should also be generally applicable for incorporating boron in fibers prepared from SiC powders (such as prepared in U.S. Pat. Nos. 4,908,340, 4,942,011, and 5,063,107).

In the typical method used for preparing the SiC fiber spinning solutions, the PCS polymer and the spinning and sintering additives are initially mixed with an excess of solvent in order to facilitate the mixing process and the subsequent filtration process. During the spin dope preparation, it is possible, although not necessary, to add a polymerization catalyst, such as a peroxide (e.g., dicumyl peroxide) or other compounds known to be effective hydrogen abstracters or those which generate reactive radicals. The mixed solution is filtered through filters of $\leq 0.5$ $\mu$m in order to remove impurities, particulates, microgels, etc. which can create strength-degrading flaws in the fibers. The excess solvent is then removed by an evaporation method, such as rotary evaporation (rotovapping).

The spin dope is dry spun using conventional techniques to produce fine-diameter, "green" fibers. Because a PCS with high molecular weight is used in this process, the green fibers have relatively high tensile strengths with typical values in the range of 15 to 30 MPa, which is approximately 3 to 6 times higher than melt-spun green fibers produced from low-molecular-weight PCS. Since green fibers are very fragile compared to heat-treated fibers, this provides a significant advantage in handling and further processing of the fibers without breaking and damaging the fibers.

The green fibers are then heat treated to accomplish evaporation of residual solvent not removed during the spinning operation, pyrolysis to decompose the organosilicon polymer to an SiC ceramic, adjustment of the final SiC fiber stoichiometry (i.e., Si:C ratio), and sintering (densification) to produce a high strength fiber. During the early stages of the heat treatment (i.e., at low temperatures after residual solvent is removed), the fibers are exposed to an oxidizing atmosphere, such as air or oxygen, in order to incorporate some oxygen in the fiber in order to create Si—O bonds. In a subsequent stage of the heat treatment, the oxygen and excess carbon are removed as volatile products, thereby creating SiC with the approximate stoichiometric composition if the appropriate amount of oxygen is introduced into the polymer fibers. Therefore, the fibers initially can be heated to temperatures in the range up to 50°–100° C. in a non-oxidizing atmosphere to remove solvent and then the atmosphere can be switched to an oxidizing condition, such as air or oxygen, between approximately 100°–300° C. to accomplish oxygen incorporation. Alternatively, the fibers can be heated in the oxidizing atmosphere from the very start of the process. It should be recognized that the temperature ranges used to remove solvent and incorporate oxygen can be varied by changing the heating rates and/or by introducing hold periods at various temperatures. After oxygen incorporation at the low temperature (in the range of approximately 100°–300° C.), it is necessary to change to a non-oxidizing atmosphere, such as nitrogen or argon. At temperatures in the range of approximately 400°–1200° C., the organosilicon polymer fiber undergoes pyrolysis in which volatiles are formed and removed and the fiber is converted to a SiC-based ceramic fiber. It should be recognized that the temperature ranges used to accomplish decomposition of the organosilicon polymer fiber to a SiC-based ceramic fiber can be varied by changing the heating rates and/or by introducing hold periods at various temperatures. After this pyrolysis stage, the fiber still contains oxygen. With further heat treatment in the range of approximately 1300°–1600° C., oxygen and excess carbon are removed by further pyrolysis reactions, which are commonly referred to as carbothermal reduction reactions, in which volatiles, such as carbon monoxide (CO) and silicon monoxide (SiO), are formed and removed (i.e., see reactions (1)–(3) shown earlier). The final Si:C ratio in the fiber depends upon the amount of oxygen originally added at low temperature, but in the preferred embodiment of this invention sufficient oxygen is added to create an SiC fiber with an approximately 1:1 atomic ratio (i.e., approximately 70:30 weight ratio) of Si:C or an SiC fiber with slightly carbon-rich stoichiometry. It should be recognized that the temperature ranges used to accomplish this pyrolysis reaction can be varied by changing the heating rates and/or by introducing hold periods at various temperatures. After the pyrolysis reaction, the fibers contains microporosity. This microporosity is removed by heat treatment (sintering) in non-oxidizing atmospheres at temperatures in the range of approximately 1700° C. to 2000° C.

The resulting fibers have high relative density (i.e., little or no porosity). This is because boron incorporated in the fiber via the soluble boron precursor added to the spin dope allows densification processes to dominate over coarsening processes during the high temperature heat treatment stage. The typical bulk density is 3.15 g/cm$^3$ with a maximum density of approximately 3.2 g/cm$^3$ which is close to the theoretical density of stoichiometric SiC. The bulk densities are determined by the sink-float procedure (ASTM procedure D3800-79). The fibers have near-stoichiometric compositions which are usually approximately 66 to 70 wt % Si and approximately 30 to 34 wt % C. The residual oxygen and nitrogen contents are very low (usually less than 0.2 wt %). The Si, C, O, and N contents are typically determined by an electron microprobe analyzer equipped with X-ray wavelength dispersive spectrometers. The fibers have a microstructure which consist mostly of 0.03 to 0.3 $\mu$m $\beta$-SiC grains, although larger grains and $\alpha$-SiC grains can be formed by using higher temperatures during the final stage of the heat treatment. The fibers typically have smooth surfaces, round cross-sections, and average diameters in the range of 8–15 $\mu$m, although smaller and larger fiber diameter fibers are possible.

Figure 2:
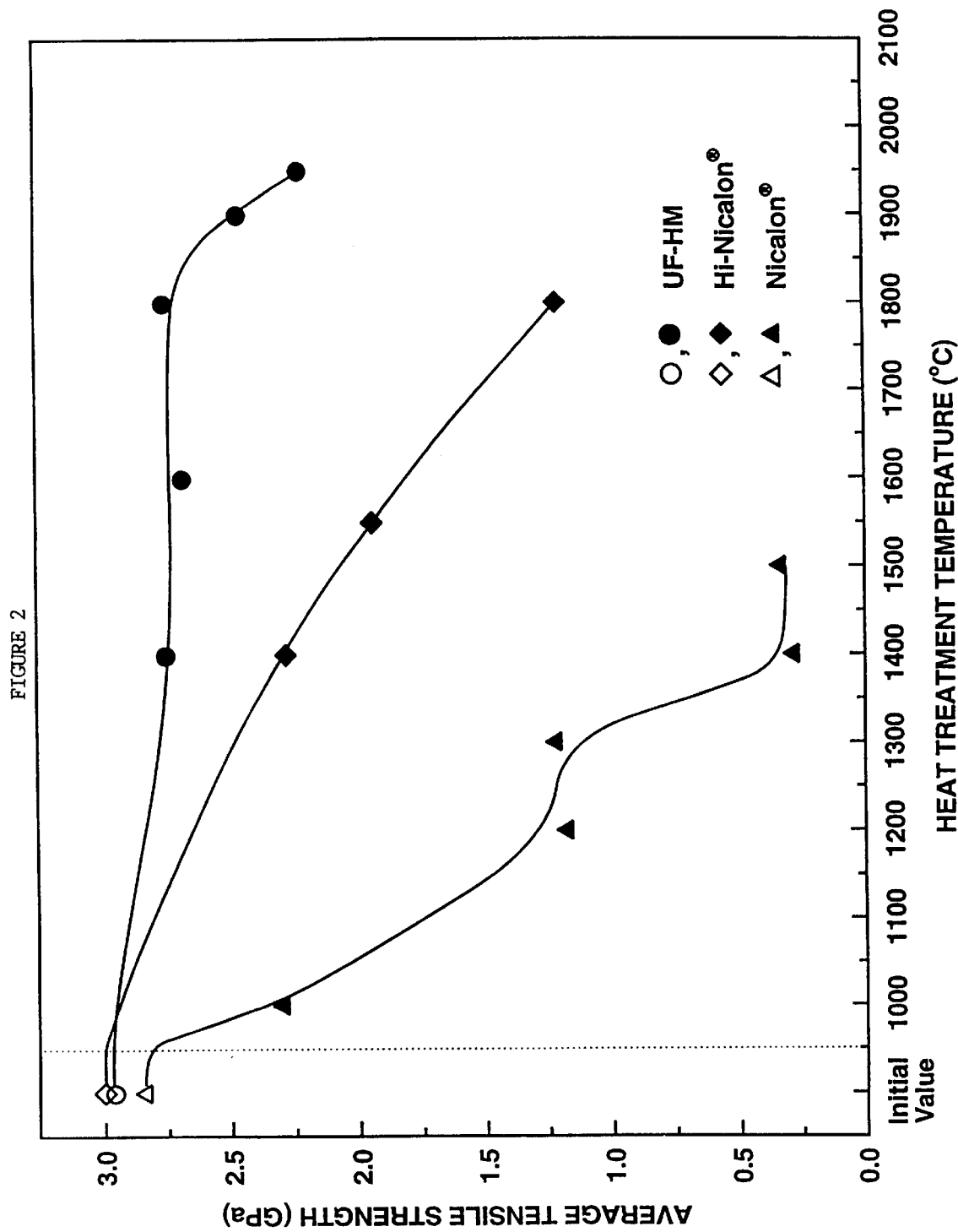
FIG. 2 is a graph showing average tensile strength for various fibers after being subjected to different heat treatment temperatures.

The fibers have high tensile strength at room temperature with average values mostly in the range of approximately 2.0–4.0 GPa (290–580 ksi). A histogram plot of the distribution of fiber tensile strengths obtained from testing approximately 2,000 individual fibers is shown in FIG. 1. The average fiber tensile strength is high (i.e., 2.85 GPa (413 ksi)). (Fiber tensile strengths were determined according to ASTM procedure D3379.) The fibers also have excellent thermomechanical stability. For example, the fibers can be heat treated at a temperature of 1800° C. in argon for 4 hrs and will still typically retain more than 90% of the original (as-fabricated) strength in room temperature tensile tests. The excellent thermomechanical stability of the fibers from this invention is also illustrated in FIG. 2 which shows the room temperature tensile strengths of various fibers after heat treatment for approximately one hour in argon at temperatures up to 1950° C. The fibers in this invention (designated as "UF-HM") showed excellent strength retention, retaining an average tensile strength of at least 2.0 GPa (290 ksi) after heat treatment at 1950° C. In contrast, NICALON™ fibers showed a very large drop in tensile strength at much lower temperatures, as seen in FIG. 2. FIG. 2 also shows that HI-NICALON™ fibers decrease in tensile strength sharply at much lower temperatures compared to the fibers in the present invention.

It is also obvious that the boron-doping method described in this invention should be generally applicable for incorporating, in a homogeneous manner, controlled amounts of boron during the fabrication of other SiC shapes besides fibers, including SiC films and SiC bulk objects.

It is well known that SiC films and coatings can be prepared from organosilicon polymer precursors. The spinning solutions used in this invention to form SiC fibers can also be used to form SiC films and coatings with homogeneously doped boron. The only significant difference is that the formation of films and coatings is generally carried out using solutions which have significantly lower viscosity than the solutions used in fiber spinning operations. Hence, the solution used to form SiC films and coatings would be prepared in the same way as the solutions used to form the SiC fibers except that the amount of solvent removed by evaporation would be less in order to maintain a lower solution viscosity, i.e., the polymer concentration in the solutions used to form films and coatings would be lower. The films and coatings can be deposited on the desired substrates by any conventional method, such as dip coating, spin coating, spray coating, roller coating, etc. The films or coatings are then subsequently heat treated to obtain dense, fine grain films or coatings.

In conventional powder processing of bulk SiC articles, SiC powders are formed or compacted into shapes by methods such as slip casting, extrusion, injection molding, dry pressing, etc., and the shaped powder compacts are subsequently sintered at high temperature to achieve high relative density. Prior to such operations, powders can be homogeneously doped with boron by mixing a solution which contains the boron containing precursor and the organosilazane polymer or other nitrogen containing precursor, with an SiC powder suspension which is prepared with the same solvent, or a miscible solvent, used in the solution with the boron precursor. The resulting SiC powder suspension, in which the boron precursor is dissolved in the liquid phase of the suspension, could then be shaped or formed by conventional means into a bulk powder compact with homogenous distribution of the boron precursor in the voids of the resulting powder compact or, alternatively, the suspension could be dried to give a SiC powder which would have a uniform distribution of the boron precursor. In the later case, the boron precursor containing SiC powder could then be used in other conventional bulk article forming operations such as dry pressing, isostatic pressing, etc.

It is well known that organosilicon polymer precursors to SiC are also used to form the SiC "matrix" phase in composites formed by infiltration routes, such as the infiltration of organosilicon polymer solutions into continuous fiber pre-forms, followed by heat treatment to remove solvent, decompose the organosilicon polymer and form silicon carbide. The spinning solutions used to form SiC fibers in this invention can also be used as an infiltrating solution for forming the SiC matrix phase in composites. The only significant difference is that the infiltration is generally carried out using solutions which have much lower viscosity than the solutions used in fiber spinning operations. Hence, the solutions used for infiltration would be prepared in the same way as the solutions used in forming the SiC fibers except that the amount of solvent removed by evaporation would be substantially less in order to maintain a lower solution viscosity. By using such solutions, the SiC matrix formed by the infiltration method would have a homogenous distribution of boron.

EXAMPLES

Example 1

Polycarbosilane (PCS) with molecular weight of approximately 11,000 was prepared by pressure pyrolysis according to the procedure of Toreki et al. This polymer did not melt upon heat treatment in nitrogen. Polyvinylsilazane (PSZ) was prepared according to the procedures of Toreki et al. Solid boron hydride (SBH), dicumyl peroxide (DCP), and toluene were obtained commercially and used without any modification. A solution was prepared by mixing 8.4 mL toluene, 3.8 g PCS, 0.25 g PSZ, 0.13 g SBH, and 25 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. Fourteen fibers were tested after heat treatment. The average diameter was 13.0 μm and the average tensile strength was 2.97 GPa (431 ksi). Another portion of the green fibers was first heat treated in air at 190° C. for 4 hours and then to 1150° C. (1 hour hold) in nitrogen. Fourteen fibers were tested after heat treatment. The average diameter was 13.4 μm and the average tensile strength was 2.43 GPa (352 ksi). Some of these fibers were subsequently heat treated in an argon atmosphere to a maximum temperature of 1800° C. for 1 hour. 14 fibers were tested after heat treatment. The average diameter was 11.1 μm and the average tensile strength was 3.26 GPa (473 ksi). Another portion of the green fibers was first heat treated in air at 200° C. for 4 hours and then to 1150° C. (1 hour hold) in nitrogen. Some of these fibers were subsequently heat treated in an argon atmosphere to a maximum temperature of 1800° C. for 1 hour. 16 fibers were tested after heat treatment. The average diameter was 11.2 μm and the average tensile strength was 2.90 GPa (421 ksi). The density of the fibers (determined by the sink-float method) was 3.15 g/cm³.

Example 2

PCS with molecular weight of approximately 11,000 was prepared by pressure pyrolysis as in Example 1. PSZ was also prepared as in Example 1. Polyisobutylene (PIB), solid boron hydride (SBH), dicumyl peroxide (DCP), and toluene were obtained commercially and used without any modification. A solution was prepared by mixing 8.6 mL toluene, 3.89 g PCS, 0.25 g SBH, 0.06 g PIB, 0.04 g PSZ, and 4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 11.1 μm and the average tensile strength was 2.75 GPa (399 ksi). Another portion of the green fibers was first heat treated in air at 235° C. for 1 hour and then to 1150° C. (1 hour hold) in nitrogen. The fibers were subsequently heat treated in an argon atmosphere to a maximum temperature of 1800° C. for 2 hours. 6 fibers were tested after heat treatment. The average diameter was 9.7 μm and the average tensile strength was 2.31 GPa (335 ksi). The density of the fibers (determined by the sink-float method) was 3.09 g/cm³. The Si:C weight ratio in these fibers was 69:31, as determined by electron microprobe analysis, Example 3

PCS with molecular weight of approximately 11,000 and PSZ were prepared. Polyvinylsiloxane (PSO) were prepared according to the procedures of Toreki et al. for PSZ preparation, except that a siloxane monomer was used instead of a silazane monomer in the polymerization reaction. A solution was prepared by mixing 8.3 mL toluene, 3.82 g PCS, 0.25 g PSO, 0.11 g SBH, 0.04 g PSZ, and 4 mg DCP. The solution was filtered and then concentrated by rotary evaporation to increase the viscosity until the solution had a solvent (toluene) concentration in the range of approximately 30–35% . The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 12.8 μm and the average tensile strength was 3.13 GPa (454 ksi). Another portion of the green fibers was first heat treated in air at 190° C. for 4 hour and then to 1150° C. (1 hour hold) in nitrogen. Some of these fibers were subsequently heat treated in an argon atmosphere to a maximum temperature of 1775° C. for 1 hour. 23 fibers were tested after heat treatment. The average diameter was 11.1 μm and the average tensile strength was 2.88 GPa (418 ksi). The density of the fibers (determined by the sink-float method) was 3.17 g/cm³. The Si:C weight ratio in these fibers was approximately 69.5:31.5, as determined by electron microprobe analysis.

Example 4

PCS with molecular weight of approximately 11,000 and PSZ were prepared. A solution was prepared by mixing 8.6 mL toluene, 3.89 g PCS, 0.25 g SBH, 0.06 g PIB, 0.01 g PSZ, and 1 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. A portion of the green fibers was first heat treated in air at 225° C. for 1 hour and then to 1150° C. (1 hour hold) in nitrogen. 13 fibers were tested after heat treatment. The average diameter was 14.0 μm and the average tensile strength was 2.43 GPa (352 ksi). The fibers were subsequently heat treated in an argon atmosphere to a maximum temperature of 1750° C. for 1 hour. 11 fibers were tested after heat treatment. The average diameter was 11.9

μm and the average tensile strength was 2.54 GPa (368 ksi). The density of the fibers (determined by the sink-float method) was 3.15 g/cm$^3$.

Example 5

PCS with molecular weight of approximately 7,000 and PSZ were prepared. A solution was prepared by mixing 13.7 mL toluene, 3.48 g PCS, 0.25 g SBH, 0.06 g PIB, 0.01 g PSZ, and 1 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 10.9 μm and the average tensile strength was 2.17 GPa (315 ksi). Another portion of the green fibers was first heat treated in air at 200° C. for 1 hour and then to 1150° C. (1 hour hold) in nitrogen. The fibers were subsequently heat treated in an argon atmosphere to a maximum temperature of 1800° C. for 6 hours. 14 fibers were tested after heat treatment. The average diameter was 9.6 μm and the average tensile strength was 2.24 GPa (325 ksi).

Example 6

PCS with molecular weight of approximately 13,000 and PSZ were prepared. A solution was prepared by mixing 10.9 mL toluene, 3.96 g PCS, 0.25 g SBH, 0.04 g PSZ, and 0.4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 12.4 μm and the average tensile strength was 3.40 GPa (493 ksi). Another portion of the green fibers was first heat treated in air at 175° C. for 2 hour and then to 1150° C. (1 hour hold) in nitrogen. 13 fibers were tested after heat treatment. The average diameter was 12.6 μm and the average tensile strength was 3.16 GPa (458 ksi). Some of these fibers were subsequently heat treated in an argon atmosphere to a maximum temperature of 1750° C. for 1 hour. 14 fibers were tested after heat treatment. The average diameter was 12.6 μm and the average tensile strength was 2.62 GPa (380 ksi). Another portion of the green fibers was first heat treated in air at 215° C. for 1 hour and then to 1150° C. (1 hour hold) in nitrogen. 14 fibers were tested after heat treatment. The average diameter was 14.0 μm and the average tensile strength was 3.21 GPa (466 ksi). Some of these fibers were subsequently heat treated in an argon atmosphere to a maximum temperature of 1750° C. for 1 hour. 15 fibers were tested after heat treatment. The average diameter was 11.6 μm and the average tensile strength was 3.04 GPa (441 ksi). Another portion of the green fibers was first heat treated in air at 225° C. for 1 hour and then to 1150° C. (1 hour hold) in nitrogen. The fibers were subsequently heat treated in an argon atmosphere to a maximum temperature of 1750° C. for 1 hour. 15 fibers were tested after heat treatment. The average diameter was 11.0 μm and the average tensile strength was 2.81 GPa (408 ksi).

Example 7

PCS with molecular weight of approximately 11,000 and PSZ were prepared. A solution was prepared by mixing 9.2 mL toluene, 3.94 g PCS, 0.25 g SBH, 0.02 g PSZ, and 2 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. A portion of the green fibers was first heat treated in oxygen at 145° C. for 4 hour and then to 1150° C. (1 hour hold) in nitrogen. 13 fibers were tested after heat treatment. The average diameter was 15.3 μm and the average tensile strength was 2.17 GPa (315 ksi). Some of these fibers were subsequently heat treated in an argon atmosphere to a maximum temperature of 1750° C. for 1 hour. 16 fibers were tested after heat treatment. The average diameter was 12.8 μm and the average tensile strength was 2.62 GPa (380 ksi).

Example 8

PCS with molecular weight of approximately 11,000, PSZ, and PSO were prepared. A solution was prepared by mixing 9 mL toluene, 3.45 g PCS, 0.59 g of PSO, 0.13 g SBH, 0.04 g PSZ, and 4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 13.0 μm and the average tensile strength was 3.39 GPa (492 ksi). Another portion of the green fibers was first heat treated in air at 175° C. for 4 hours and then to 1150° C. (1 hour hold) in nitrogen. 14 fibers were tested after heat treatment. The average diameter was 13.6 μm and the average tensile strength was 2.85 GPa (413 ksi). Some of these fibers were subsequently heat treated in an argon atmosphere to a maximum temperature of 1775° C. for 1 hour. 13 fibers were tested after heat treatment. The average diameter was 11.8 μm and the average tensile strength was 2.98 GPa (432 ksi).

Example 9

PCS with molecular weight of approximately 13,000, PSZ, and PSO were prepared. A solution was prepared by mixing 9.0 mL toluene, 3.44 g PCS, 0.63 g PSO, 0.08 g SBH, 0.04 g PSZ, and 4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. 16 green fibers were tested for tensile strength. The average tensile strength was 22 MPa. A portion of the green fibers was directly heated to 1150° C. (1 hour hold) in nitrogen. 14 fibers were tested after heat treatment. The average diameter was 12.2 μm and the average tensile strength was 2.72 GPa (395 ksi). Another portion of the green fibers was first heat treated in air at 130° C. for 1 hour and then to 1150° C. (1 hour hold) in nitrogen. Some of these fibers were subsequently heat treated in an argon atmosphere to a maximum temperature of 1845° C. for 12 min. 17 fibers were tested after heat treatment. The average diameter was 10.0 μm and the average tensile strength was 2.99 GPa (434 ksi).

Example 10

PCS with molecular weight of approximately 11,000 and PSZ were prepared. A solution was prepared by mixing 8.0 mL toluene, 3.61 g PCS, 0.13 g SBH, 0.42 g PSZ, and 42 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 13.3 µm and the average tensile strength was 3.16 GPa (458 ksi). Another portion of the green fibers was first heat treated in air at 160° C. for 1 hour and then to 1150° C. (1 hour hold) in nitrogen. Some of these fibers were subsequently heat treated in an argon atmosphere to a maximum temperature of 1775° C. for 1 hour. 16 fibers were tested after heat treatment. The average diameter was 11.6 µm and the average tensile strength was 3.00 GPa (435 ksi).

Example 11

PCS with molecular weight of approximately 11,000 and PSZ were prepared. A solution was prepared by mixing 8.7 mL toluene, 4.0 g PCS, 0.06 g SBH, 0.13 g PSZ, and 13 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 13.5 µm and the average tensile strength was 3.04 GPa (441 ksi). Another portion of the green fibers was first heat treated in air at 175° C. for 2 hours and then to 1150° C. (1 hour hold) in nitrogen. Some of these fibers were subsequently heat treated in an argon atmosphere to a maximum temperature of 1775° C. for 1 hour. 16 fibers were tested after heat treatment. The average diameter was 12.0 µm and the average tensile strength was 2.76 GPa (400 ksi). The density of the fibers (determined by the sink-float method) was 3.14 g/cm$^3$. The Si:C weight ratio in these fibers was approximately 69:31, as determined by electron microprobe analysis.

Example 12

PCS with molecular weight of approximately 11,000, PSZ, and PSO were prepared. A solution was prepared by mixing 9.0 mL toluene, 3.80 g PCS, 0.29 g PSO, 0.06 g SBH, 0.04 g PSZ, and 4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. A portion of the green fibers was first heat treated in air at 160° C. for 1 hour and then to 1150° C. (1 hour hold) in nitrogen. 14 fibers were tested after heat treatment. The average diameter was 16.4 µm and the average tensile strength was 2.48 GPa (360 ksi). Some of these fibers were subsequently heat treated in an argon atmosphere to a maximum temperature of 1800° C. for 1 hour. 14 fibers were tested after heat treatment. The average diameter was 13.9 µm and the average tensile strength was 2.51 GPa (364 ksi). Some of the fibers heat treated at 1800° C. were re-heat treated at 1800° C. in argon for 4 hours. 14 fibers were tested after heat treatment. The average diameter was 13.2 µm and the average tensile strength was 2.75 GPa (399 ksi).

Example 13

The fibers were prepared in the same manner as in Example 12 except that heat treatment conditions were varied. A portion of the green fibers was first heat treated in air at 165° C. for 1 hour and then to 1150° C. (1 hour hold) in nitrogen. Some of these fibers were subsequently heat treated in an argon atmosphere to a maximum temperature of 1890° C. for 2 minutes. 27 fibers were tested after heat treatment. The average diameter was 11.2 µm and the average tensile strength was 3.24 GPa (470 ksi).

Example 14

PCS with molecular weight of approximately 11,000 and PSZ were prepared. A solution was prepared by mixing 9.1 mL toluene, 4.04 g PCS, 0.13 g SBH, 0.02 g PSZ, and 2 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 13.6 µm and the average tensile strength was 2.72 GPa (395 ksi). Another portion of the green fibers was first heat treated in air at 175° C. for 6 hours and then to 1150° C. (1 hour hold) in nitrogen. 14 fibers were tested after heat treatment. The average diameter was 15.4 µm and the average tensile strength was 2.28 GPa (331 ksi). Some of these fibers were subsequently heat treated in an argon atmosphere to a maximum temperature of 1750° C. for 1 hour. 13 fibers were tested after heat treatment. The average diameter was 13.5 µm and the average tensile strength was 2.85 GPa (413 ksi). Another portion of the green fibers was first heat treated in oxygen at 145° C. for 4 hours and then to 1150° C. (1 hour hold) in nitrogen. 14 fibers were tested after heat treatment. The average diameter was 15.1 µm and the average tensile strength was 2.41 GPa (350 ksi). Some of these fibers were subsequently heat treated in an argon atmosphere to a maximum temperature of 1750° C. for 1 hour. 16 fibers were tested after heat treatment. The average diameter was 13.2 µm and the average tensile strength was 2.86 GPa (415 ksi).

Example 15

PCS with molecular weight of approximately 11,000 and PSZ were prepared. A solution was prepared by mixing 9 mL toluene, 3.23 g PCS, 0.06 g SBH, 0.04 g PSZ, and 4 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 12.8 µm and the average tensile strength was 2.89 GPa (419 ksi). Another portion of the green fibers was first heat treated in air at 170° C. for 2 hours and then to 1150° C. (1 hour hold) in nitrogen. Some of these fibers were subsequently heat treated in an argon atmosphere to a maximum temperature of 1775° C. for 1 hour. 16 fibers were tested after heat treatment. The average diameter was 11.9 µm and the average tensile strength was 2.66 GPa (386 ksi).

Example 16

PCS with molecular weight of approximately 11,000, PSZ and PSO were prepared. A solution was prepared by mixing 9 mL toluene, 3.23 g PCS, 0.84 g of PSO, 0.13 g SBH, 0.02 g PSZ, and 2 mg DCP. The solution was filtered and then concentrated by rotary evaporation to increase the viscosity until the solution had a solvent (toluene) concentration in the range of approximately 30–35%. The concentrated polymer solution was used to form "green" fibers by the conventional dry spinning method. Portions of the green fibers were given different heat treatments. One portion was directly heated to 1150° C. (1 hour hold) in nitrogen. 14 fibers were tested after heat treatment. The average diameter was 13.9 $\mu$m and the average tensile strength was 3.31 GPa (480 ksi). Another portion of the green fibers was first heat treated in air at 175° C. for 4 hours and then to 1150° C. (1 hour hold) in nitrogen. Some of these fibers were subsequently heat treated in an argon atmosphere to a maximum temperature of 1775° C. for 1 hour. Twelve fibers were tested after heat treatment. The average diameter was 11.0 $\mu$m and the average tensile strength was 3.42 GPa (496 ksi).

It is contemplated that obvious equivalents and substitutions for elements, components and steps set forth above may be known to those skilled in the art. The above presented examples are by way of illustration only. The true scope and definition of the invention is to be as set forth in the following claims.

We claim:

1. A, homogeneously boron doped, polymer derived, silicon carbide fiber produced by the process comprising the steps of providing a spin dope solution comprising a silicon carbide forming organosilicon polymer, a solvent, a soluble boron precursor and a nitrogen containing precursor which reacts with said soluble boron precursor to form a boron compound such that boron remains in said fiber after heat treating; forming green fibers from said spin dope solution by spinning; and heat treating to sinter said green fibers to produce, homogeneously doped, boron containing fibers having a tensile strength of at least 2.0 GPa, wherein the fiber retains at least 90% of the original tensile strength after being heated treated at a temperature of up to 1800° C.

2. A sintered, boron doped, polymer derived, silicon carbide fiber where said boron is homogeneously dispersed within said fiber, wherein the fiber retains at least 90% of the original tensile strength after being heated treated at a temperature of up to 1800° C.

3. The fiber of claim 2, where said fiber has average tensile strength of at least 2.0 GPa after heat treatment at 1950 degrees C.

4. The fiber of claim 2, where said fiber has average tensile strength within the range of about 2 to 4 GPa at room temperature.

5. The fiber of claim 1, where said organosilicon polymer is present in said solution from about 50 to 80 weight percent.

6. The fiber of claim 1, where said soluble boron precursor is present in said solution from about 0.25 to 4 weight percent.

7. The fiber of claim 1, where said heat treating includes the step of heating said green fibers in the range of about 25 to 300 degrees C. in an oxidizing atmosphere, and then up to about 1700 to 2000 degrees C. in a non-oxidizing atmosphere.

8. The fiber of claim 1, where said soluble boron precursor and said nitrogen containing precursor are premixed, then added to said spin dope solution containing said silicon carbide forming organosilicon polymer and said solvent.

9. The fiber of claim 1, where said heat treatment is performed at between 1700 and 2000 degrees C.

10. The fiber of claim 1, where said heat treatment is performed at 1950 degrees C.

11. The fiber of claim 1, where said boron is homogeneously dispersed on a molecular level within said fiber.

12. The fiber of claim 2, where said boron is homogeneously dispersed on a molecular level within said fiber.

13. The fiber of claim 1, where said fiber has an average tensile strength of 2.85 GPa.

14. The fiber of claim 4, where said fiber has an average tensile strength of 2.85 GPa.

* * * * *